US012528296B2

(12) United States Patent
Nakamura

(10) Patent No.: US 12,528,296 B2
(45) Date of Patent: Jan. 20, 2026

(54) INKJET RECORDING APPARATUS CAPABLE OF SUPPRESSING AN INFLUENCE OF A CHANGE IN BELT SPEED DURING IMAGE RECORDING

(71) Applicant: KYOCERA Document Solutions Inc., Osaka (JP)

(72) Inventor: Satoru Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 274 days.

(21) Appl. No.: 18/550,103

(22) PCT Filed: Mar. 9, 2022

(86) PCT No.: PCT/JP2022/010246
§ 371 (c)(1),
(2) Date: Sep. 11, 2023

(87) PCT Pub. No.: WO2022/196483
PCT Pub. Date: Sep. 22, 2022

(65) Prior Publication Data

US 2024/0149586 A1 May 9, 2024

(30) Foreign Application Priority Data

Mar. 15, 2021 (JP) ................................ 2021-041017

(51) Int. Cl.
*B41J 2/165* (2006.01)
*B41J 2/155* (2006.01)
*B41J 11/00* (2006.01)

(52) U.S. Cl.
CPC ........... *B41J 2/16585* (2013.01); *B41J 2/155* (2013.01); *B41J 11/007* (2013.01); *B41J 2002/16591* (2013.01)

(58) Field of Classification Search
CPC ...... B41J 2/16585; B41J 2/155; B41J 11/007; B41J 2002/16591; B41J 2/01; B41J 2/16526
See application file for complete search history.

(56) References Cited

U.S. PATENT DOCUMENTS

2005/0162452 A1* 7/2005 Kachi .................... B41J 29/377 347/13
2006/0023049 A1 2/2006 Koike et al. .................. 347/104

FOREIGN PATENT DOCUMENTS

JP 2005-081591 A 3/2005
JP 2005-205901 A 8/2005
(Continued)

*Primary Examiner* — Bradley W Thies
(74) *Attorney, Agent, or Firm* — Stein IP, LLC

(57) ABSTRACT

An inkjet recording apparatus includes a line head including at least one recording head, an endless conveyance belt having a plurality of openings and carrying and conveying a recording medium, a driving roller, one or more stretching rollers, and a control portion. The driving roller contacts an inner circumferential surface of the conveyance belt and drives to rotate the conveyance belt. The conveyance belt has opening groups each composed of a plurality of the openings and formed in plural locations at prescribed spacings in the conveyance direction. In a state where any one of the opening groups is in contact with the driving roller, at least one of others of the opening groups is positioned immediately below the line head.

13 Claims, 9 Drawing Sheets

(56) References Cited

FOREIGN PATENT DOCUMENTS

| | | | |
|---|---|---|---|
| JP | 2006-021399 | A | 1/2006 |
| JP | 2008-179167 | A | 8/2008 |

* cited by examiner

INKJET RECORDING APPARATUS CAPABLE OF SUPPRESSING AN INFLUENCE OF A CHANGE IN BELT SPEED DURING IMAGE RECORDING

CROSS-REFERENCE TO RELATED APPLICATIONS

This application is a national stage of International Application No. PCT/JP2022/010246, filed Mar. 9, 2022, which claims the benefit of Japanese Application No. 2021-041017, filed Mar. 15, 2021, in the Japanese Patent Office, the disclosures of which are incorporated herein by reference.

TECHNICAL FIELD

The present invention relates to an inkjet recording apparatus.

BACKGROUND ART

Conventionally, in an inkjet recording apparatus such as an inkjet printer, in order to reduce or prevent clogging of nozzles due to drying of ink, flushing (idle ejection) is performed in which the ink is periodically ejected through the nozzles. For example, in each of inkjet recording apparatuses described in Patent Documents 1 and 2, respectively, a conveyance belt that conveys a recording medium has flushing openings provided therein at prescribed spacings, and at a prescribed timing during every revolution of the conveyance belt, ink is ejected through nozzles of recording heads to pass through the openings of the conveyance belt.

In Patent Document 1, in order to reduce a time required for the flushing during continuous recording on recording media and to achieve excellent recording quality, the recording media are placed on the conveyance belt so as not to overlap the openings. In Patent Document 2, in order to reduce meandering of the conveyance belt, the openings are formed symmetrically with respect to a center line of the conveyance belt in a width direction thereof orthogonal to a conveyance direction of the conveyance belt.

CITATION LIST

Patent Literature

Patent Document 1: Japanese Unexamined Patent Application Publication No. 2006-21399
Patent Document 2: Japanese Unexamined Patent Application Publication No. 2008-179167

SUMMARY OF INVENTION

Technical Problem

In a case where a plurality of openings (an opening group) disposed in the width direction and the conveyance direction of the conveyance belt is formed in each of plural locations on the conveyance belt at prescribed spacings in a belt advancing direction, since the openings are larger in size than sheet suction holes, in each of the locations where the opening group is formed, the conveyance belt is lower in strength than in any other parts thereof, thus varying in amount of elongation thereof. As a result, when a part of the conveyance belt in each of the locations where the opening group is formed contacts a driving roller, a belt speed is slightly decreased. When ink is ejected to a recording medium so that an image is recorded thereon, such a change in belt speed might result in a decrease in image quality.

In view of the above-described problem, it is an object of the present invention to provide an inkjet recording apparatus capable of suppressing an influence of a change in belt speed during image recording caused by flushing openings.

Solution to Problem

In order to achieve the above-described object, a first configuration of the present invention relates to an inkjet recording apparatus including a line head, a conveyance belt, a driving roller, one or more stretching rollers, and a control portion. The line head includes at least one recording head having a plurality of nozzles for ejecting ink. The conveyance belt is an endless belt having a plurality of openings and carries thereon and conveys a recording medium. The driving roller contacts an inner circumferential surface of the conveyance belt at a downstream side of the conveyance belt in a conveyance direction for conveying the recording medium and drives to rotate the conveyance belt. The one or more stretching rollers, together with the driving roller, stretch the conveyance belt over themselves. The control portion controls driving of at least one of the recording head and the conveyance belt so as to execute flushing in which, at a timing different from a timing contributing to image recording, the ink is ejected through the plurality of nozzles of at least one of the recording head to pass through any of the plurality of openings. The conveyance belt has a plurality of opening groups each composed of a plurality of openings arranged in a width direction of the conveyance belt and in the conveyance direction, each of which is identical to each of the plurality of openings, and the opening groups are formed in plural locations on the conveyance belt at prescribed spacings in the conveyance direction. In a state where any one of the opening groups is in contact with the driving roller, at least one of others of the opening groups is positioned immediately below the line head.

Advantageous Effects of Invention

According to the first configuration of the present invention, when any one of the plurality of opening groups formed in the conveyance belt is in contact with the driving roller, at least one of others of the opening groups is positioned immediately below the line head, and thus in the line head below which the at least one of others of the opening groups is positioned, the flushing is executed to prevent printing from being executed. That is, since there is a line head that does not execute printing at a timing when a variation in amount of elongation of the conveyance belt is large, it is possible to reduce an influence, on printing, of a variation in amount of elongation of the conveyance belt due to any one of the opening groups positionally coinciding with the driving roller, thus suppressing a decrease in image quality.

DESCRIPTION OF EMBODIMENTS

[1. Configuration of Inkjet Recording Apparatus]

Figure 1:
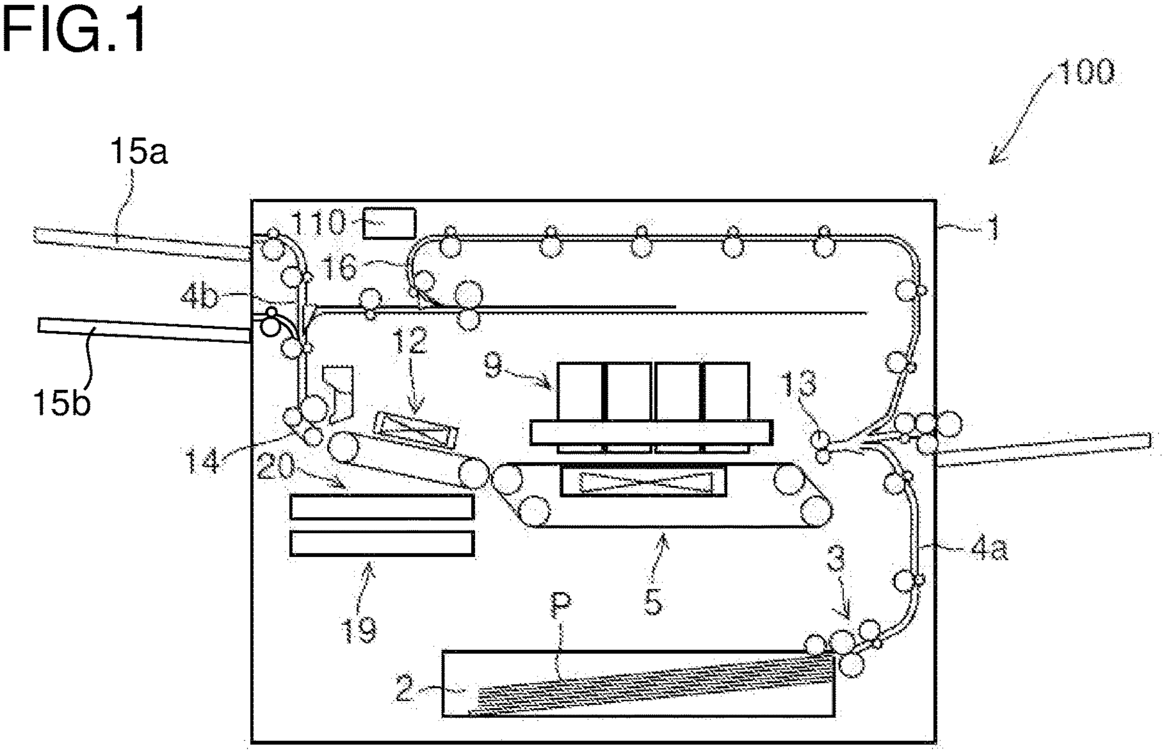
FIG. 1 is an explanatory view showing a schematic configuration of a printer as an inkjet recording apparatus according to an embodiment of the present invention.

With reference to the appended drawings, the following describes embodiments of the present invention. FIG. 1 is an explanatory view showing a schematic configuration of a printer 100 as an inkjet recording apparatus according to an embodiment of the present invention. The printer 100 includes a paper feed cassette 2 that is a sheet housing portion. The paper feed cassette 2 is disposed on a lower side in a printer main body 1. A sheet P that is an example of a recording medium is housed in the paper feed cassette 2.

A paper feed device 3 is disposed on a downstream side of the paper feed cassette 2 in a sheet conveyance direction, i.e., at an upper right part of the paper feed cassette 2 in FIG. 1. By the paper feed device 3, the sheet P is fed out one by one separately toward an upper right side of the paper feed cassette 2 in FIG. 1.

The printer 100 includes therein a first sheet conveyance path 4*a*. With respect to the paper feed cassette 2, the first sheet conveyance path 4*a* is positioned on the upper right side, which corresponds to a paper feed direction of the paper feed cassette 2. Via the first sheet conveyance path 4*a*, the sheet P fed out from the paper feed cassette 2 is conveyed vertically upward along a side surface of the printer main body 1.

A registration roller pair 13 is provided at a downstream end of the first sheet conveying path 4*a* in the sheet conveyance direction. Moreover, a first conveyance unit 5 and a recording portion 9 are disposed in immediate proximity to a downstream part of the registration roller pair 13 in the sheet conveyance direction. The sheet P fed out from the paper feed cassette 2 passes through the first sheet conveyance path 4*a* to reach the registration roller pair 13. While correcting oblique feeding of the sheet P, the registration roller pair 13 feeds out the sheet P toward the first conveyance unit 5 (particularly, an after-mentioned first conveyance belt 8) in synchronization with an ink ejection operation executed by the recording portion 9.

The sheet P fed out to the first conveyance unit 5 by the registration roller pair 13 is conveyed to an opposed position to the recording portion 9 (particularly, after-mentioned recording heads 17*a* to 17*c*) by the first conveyance belt 8. Ink is ejected from the recording portion 9 to the sheet P so that an image is recorded thereon. At this time, ejection of the ink in the recording portion 9 is controlled by a control device 110 in the printer 100.

A second conveyance unit 12 is disposed on a downstream side of the first conveyance unit 5 in the sheet conveyance direction (a left side in FIG. 1). The sheet P on which the image has been recorded by the recording portion 9 is sent to the second conveyance unit 12. The ink ejected to a surface of the sheet P is dried while the sheet P passes through the second conveyance unit 12.

A decurler portion 14 is provided on a downstream side of the second conveyance unit 12 in the sheet conveyance direction and in a neighborhood of a left side surface of the printer main body 1. The sheet P on which the ink has been dried by the second conveyance unit 12 is sent to the decurler portion 14 where a curl generated in the sheet P is corrected.

A second sheet conveyance path 4*b* is provided on a downstream side of the decurler portion 14 in the sheet conveyance direction (an upper side in FIG. 1). When duplex recording is not performed, the sheet P that has passed through the decurler portion 14 passes through the second sheet conveyance path 4*b* to be discharged onto a sheet discharge tray 15*a* provided outside a left side surface of the printer 100. Below the sheet discharge tray 15*a*, there is provided a sub-discharge tray 15*b* onto which, as the sheet P, a sheet (a waste sheet) on which a printing failure or the like has occurred is discharged.

An inversion conveyance path 16 for performing duplex recording is provided in an upper part of the printer main body 1 and above the recording portion 9 and the second conveyance unit 12. When duplex recording is performed, the sheet P that has passed through the second conveyance unit 12 and the decurler portion 14 after completion of recording on one side (a first side) thereof passes through the second sheet conveyance path **4*b* to be sent to the inversion conveyance path 16**.

The conveyance direction for conveying the sheet P sent to the inversion conveyance path 16 is switched for subsequent recording on the other side (a second side) of the sheet P. Then, the sheet P passes through the upper part of the printer main body 1 to be sent rightward so as to be sent, with the second side up, again to the first conveyance unit 5 via the registration roller pair 13. In the first conveyance unit 5, the sheet P is conveyed to the opposed position to the recording portion 9, and the ink is ejected from the recording portion 9 thereto so that an image is recorded on the second side. The sheet P after being subjected to the duplex recording sequentially passes through the second conveyance unit 12, the decurler portion 14, and the second sheet conveyance path **4*b* to be discharged onto the sheet discharge tray 15*a***.

Furthermore, a maintenance unit 19 and a cap unit 20 are disposed below the second conveyance unit 12. When executing purging, the maintenance unit 19 horizontally moves to below the recording portion 9 to wipe off the ink extruded through ink ejection ports 18 (see FIG. 2) of each of the recording heads **17*a* to 17*c* and to collect the ink thus wiped off. The purging refers to an operation of forcibly extruding the ink through the ink ejection ports 18 of each the recording heads 17*a* to 17*c* so as to discharge thickened ink, foreign matter, and air bubbles in the ink ejection ports 18. When capping ink ejection surfaces of the recording heads 17*a* to 17*c*, the cap unit 20 horizontally moves to below the recording portion 9 and further moves upward so as to be attached to lower surfaces of the recording heads 17*a* to 17*c***.

Figure 2:
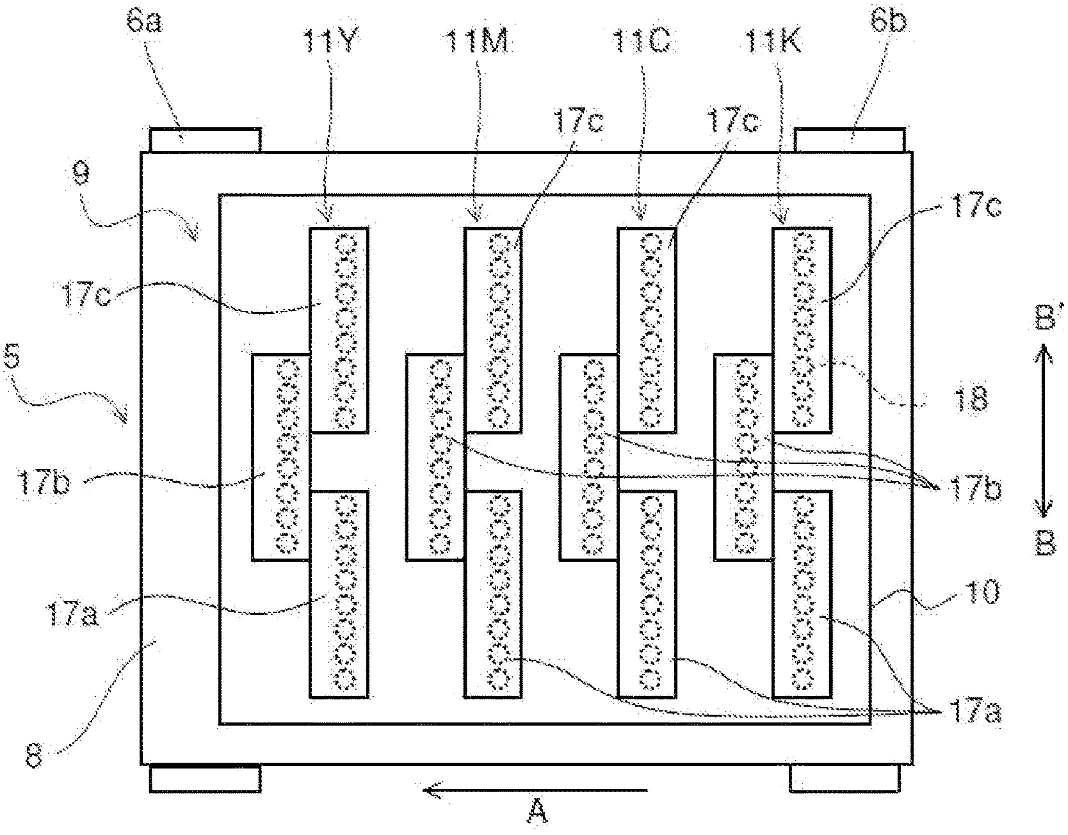
FIG. 2 is a plan view of a recording portion included in the above-described printer.

FIG. 2 is a plan view of the recording portion 9. The recording portion 9 includes a head housing 10 and line heads 11Y, 11M, 11C, and 11K. In the head housing 10, the line heads 11Y to 11K are held at a prescribed distance (for example, 1 mm) in level from a conveyance surface of the first conveyance belt 8, which is an endless belt stretched over a plurality of rollers including a driving roller **6*a*, a driven roller 6*b*, and tension rollers 7*a* and 7*b* (see FIG. 3). The driving roller 6*a* causes the first conveyance belt 8 to travel in the conveyance direction for conveying the sheet P (an arrow A direction). Driving of the driving roller 6*a* is controlled by a main control portion 110*a* (see FIG. 4) of the control device 110. The above-described plurality of rollers are disposed along a travelling direction of the first conveyance belt 8 in an order of the tension roller 7*a*, the tension roller 7*b*, the driven roller 6*b*, and the driving roller 6*a* (see FIG. 3**).

The line heads 11Y to 11K each include the plurality of (herein, three) recording heads **17*a* to 17*c*. The recording heads 17*a* to 17*c* are arrayed in a staggered manner along a sheet width direction (an arrow B-B' direction) orthogonal to the sheet conveyance direction (the arrow A direction). The recording heads 17*a* to 17*c* each have the plurality of ink ejection ports 18 (nozzles). The ink ejection ports 18 are disposed in a row at equal spacings in a recording head width direction, namely, the sheet width direction (the arrow B-B' direction). From the line heads 11Y to 11K, ink of respective colors of yellow (Y), magenta (M), cyan (C), and black (K) is ejected through the ink ejection ports 18 toward the sheet P being conveyed on the first conveyance belt 8**.

Figure 3:
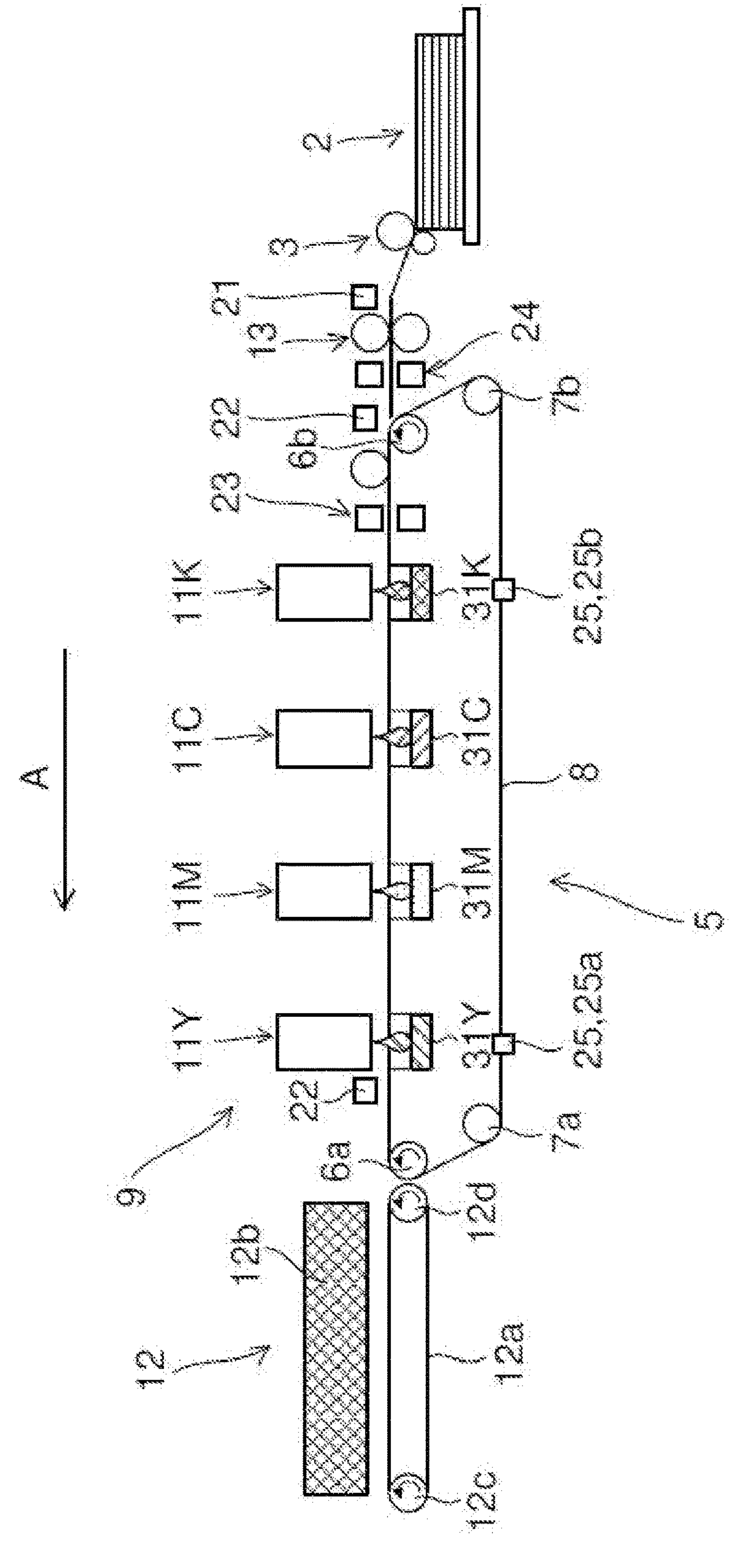
FIG. 3 is an explanatory view schematically showing a configuration in a vicinity of a conveyance path in the above-described printer along which a sheet is conveyed from a paper feed cassette to a second conveyance unit via a first conveyance unit.
Figure 4:
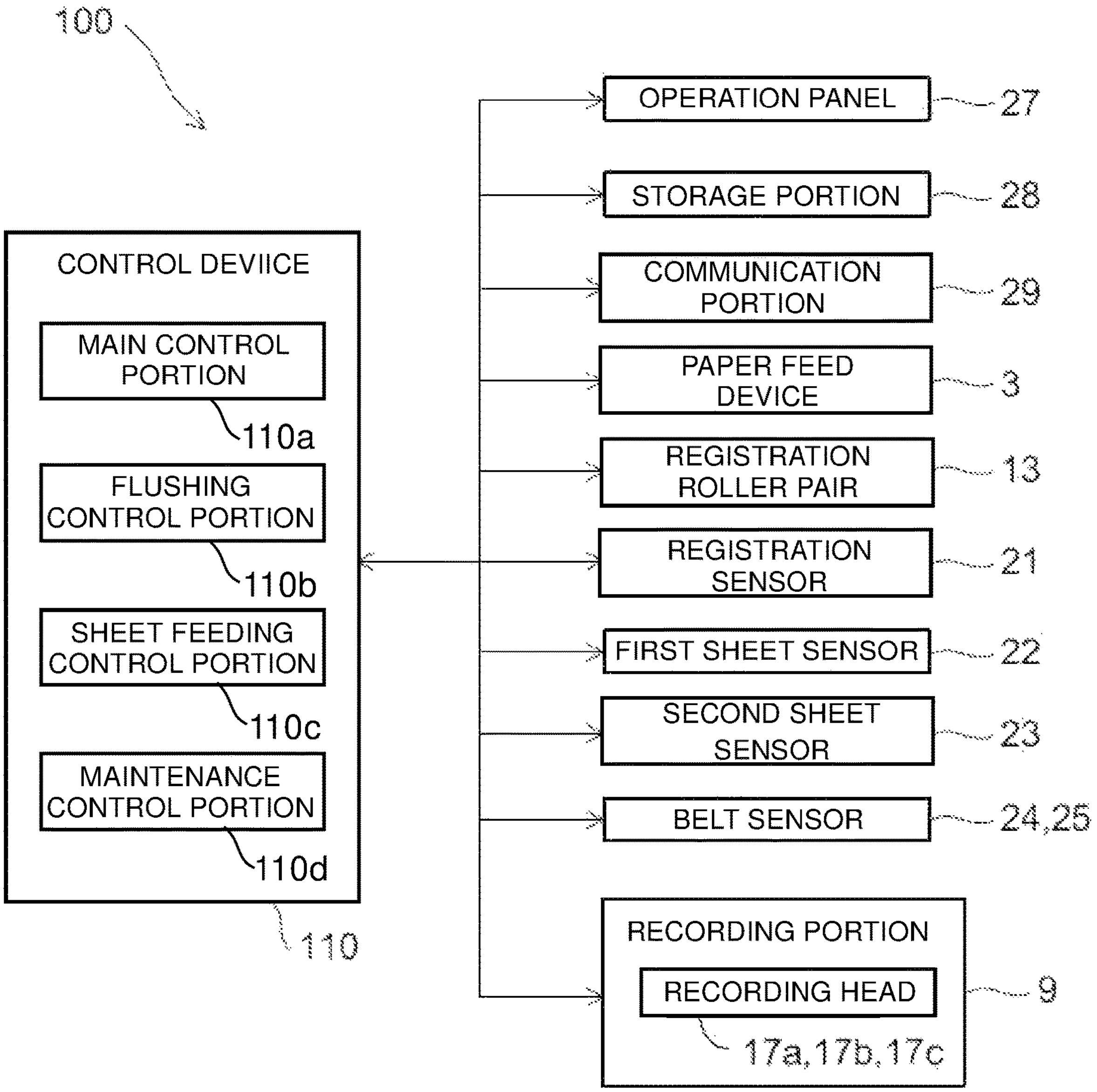
FIG. 4 is a block diagram showing a hardware configuration of a main part of the above-described printer.

FIG. 3 schematically shows a configuration in a vicinity of a conveyance path along which the sheet P is conveyed from the paper feed cassette 2 to the second conveyance unit 12 via the first conveyance unit 5. Furthermore, FIG. 4 is a block diagram showing a hardware configuration of a main part of the printer 100. In addition to the above-described configuration, the printer 100 further includes a registration sensor 21, a first sheet sensor 22, a second sheet sensor 23, and belt sensors 24 and 25.

The registration sensor 21 detects the sheet P being conveyed by the paper feed device 3 from the sheet cassette 2 to the registration roller pair 13. The registration sensor 21 is positioned on an upstream side relative to the registration roller pair 13 in a feeding direction of the sheet P. Based on a result of the detection by the registration sensor 21, the control device 110 (for example, a sheet feeding control portion **110*c*) controls a timing for starting rotation of the registration roller pair 13. For example, based on a result of the detection by the registration sensor 21, the control device 110 controls a timing for feeding, to the first conveyance belt 8, the sheet P that has been subjected to skew (oblique feed) correction by the registration roller pair 13**.

The first sheet sensor 22 detects a position of the sheet P in the width direction thereof, which is being sent from the registration roller pair 13 to the first conveyance belt 8. Based on a result of the detection by the first sheet sensor 22, the control device 110 (for example, the main control portion **110*a*) can perform control in which the ink is ejected through, among the ink ejection ports 18 of each of the recording heads 17*a* to 17*c* of each of the line heads 11Y to 11K, a set of ink ejection ports 18** corresponding to a width of the sheet P so that an image is recorded on the sheet P.

The second sheet sensor 23 detects passing of the sheet P fed to the first conveyance belt 8 by the registration roller pair 13. That is, the second sheet sensor 23 detects a position of the sheet P in the conveyance direction, which is being conveyed on the first conveyance belt 8. The second sheet sensor 23 is positioned on an upstream side of the recording portion 9 and on a downstream side of the first sheet sensor 22 in the sheet conveyance direction. Based on a result of the detection by the second sheet sensor 23, the control device 110 (for example, the main control portion **110*a*) can control a timing for ejecting the ink to the sheet P being conveyed to reach the position opposed to the line heads 11Y to 11K (the recording heads 17*a* to 17*c*) by the first conveyance belt 8**.

The belt sensors 24 and 25 is each a reference detection sensor that detects a reference specifying area Mref (see FIG. 5) provided on the first conveyance belt 8. The reference specifying area Mref is a reference area for identifying every full revolution of the first conveyance belt 8 and, as will be described later, is formed of a combination of adjacent two of opening groups 82. As will be described later, since a positional relationship between the reference specifying area Mref and the other opening groups 82 is previously known, when the belt sensors 24 and 25 detect the reference specifying area Mref on the first conveyance belt 8, based on a position of the reference specifying area Mref thus detected, there can be detected respective positions of the opening groups 82 provided in the first conveyance belt 8 in the conveyance direction. Accordingly, it can be said that the belt sensors 24 and 25 each function as an opening position detecting portion that detects the respective positions of the opening groups 82 (openings 80) of the first conveyance belt 8.

A configuration may also be adopted in which, at an end of the first conveyance belt 8 in a belt width direction thereof, marks are formed beforehand at positions corresponding to the opening groups 82, and the belt sensors 24 and 25 detect the above-described marks, thus detecting the respective positions of the opening groups 82 corresponding to the above-described marks.

In the sheet conveyance direction, the belt sensor 24 is positioned on an upstream side relative to the driven roller 6*b* over which the first conveyance belt 8 is stretched. In the sheet conveyance direction (the traveling direction of the first conveyance belt 8), the belt sensor 25 is positioned on a downstream side of the recording portion 9. While in this embodiment, the belt sensor 25 (25*a*, 25*b*) is disposed at each of two locations between the tension rollers 7*a* and 7*b*, the belt sensor 25 may be disposed at only one location. The driven roller 6*b* is positioned on an upstream side with respect to the recording portion 9 in the traveling direction of the first conveyance belt 8. The belt sensor 24 also has a function equivalent to that of the second sheet sensor 23. Based on a result of the detection by the belt sensor 24 or 25, the control device 110 (for example, the sheet feeding control portion 110*c*) can control the registration roller pair 13 to feed the sheet P to the first conveyance belt 8 at a prescribed timing.

Furthermore, a position of the sheet P is detected by the plurality of sensors (the second sheet sensor 23, the belt sensor 24), and the reference specifying area Mref on the first conveyance belt 8 is detected by the plurality of sensors (the belt sensors 24 and 25), and thus it also becomes possible to correct an error of the position thus detected or to detect an abnormality.

The first sheet sensor 22, the second sheet sensor 23, and the belt sensors 24 and 25, which are described above, may be each formed of a transmissive or reflective optical sensor, a CIS (contact image sensor), or the like.

In addition, the printer 100 may have a configuration including a meandering detection sensor that detects meandering of the first conveyance belt 8, in which based on a result of the detection thereby, the meandering of the first conveyance belt 8 is corrected.

Furthermore, the printer 100 further includes an operation panel 27, a storage portion 28, and a communication portion 29.

The operation panel 27 is an operation portion for accepting inputs of various settings. For example, by operating the operation panel 27, a user can input information on a size of the sheet P placed in the paper feed cassette 2, namely, a size of the sheet P to be conveyed by the first conveyance belt 8. Furthermore, by operating the operation panel 27, a user can also input the number of the sheets P to be printed or provide an instruction to start a printing job. Furthermore, the operation panel 27 also has a function as a notification device that provides a notification about an operation status (image recording or after-mentioned flushing) of the printer 100.

The storage portion 28 is a memory storing an operation program for the control device 110 and also storing various types of information and is configured by including a ROM (read-only memory), a RAM (random-access memory), a non-volatile memory, and so on. Information (for example, the information on the size of the sheet P or the number of sheets P) set via the operation panel 27 is stored in the storage portion 28.

The communication portion 29 is a communication interface for transmitting and receiving information between itself and an external device (for example, a personal computer (PC)). For example, when a user operates a PC to transmit a printing command together with image data to the printer 100, the image data and the printing command, which are described above, are inputted to the printer 100 via the communication portion 29. In the printer 100, based on the above-described image data, the main control portion 110*a* can control the recording heads 17*a* to 17*c* to eject the ink so that an image is recorded on the sheet P.

Furthermore, the printer 100 of this embodiment includes the control device 110. The control device 110 is configured by including, for example, a CPU (central processing unit) and a memory. Specifically, the control device 110 includes the main control portion 110*a*, a flushing control portion 110*b*, the sheet feeding control portion 110*c*, and a maintenance control portion 110*d*. Needless to say, the control portions constituting the control device 110, which are formed of a single CPU, may also be formed of separate CPUs.

The main control portion 110*a* controls operations of the various portions of the printer 100. For example, driving of the rollers in the printer 100, ejection of the ink from the recording heads 17*a* to 17*c* during image formation (other than during flushing), and so on are controlled by the main control portion 110*a*.

Based on detection of the respective positions of the openings 80 (the opening groups 82) by the belt sensor 24 or 25, the flushing control portion 110*b* controls the recording heads 17*a* to 17*c* to execute flushing. Such flushing based on detection of the respective positions of the openings 80 will be described later in detail.

The sheet feeding control portion 110*c* is a recording medium feeding control portion that controls the registration roller pair 13 as a recording medium feeding portion. For example, based on detection of the respective positions of the openings 80 by the belt sensor 24 or 25, the sheet feeding control portion 110*c* controls the registration roller pair 13. The sheet feeding control portion 110*c* can also control the registration roller pair 13 independently of detection of the respective positions of the openings 80 by the belt sensor 24 or 25 (regardless of the detection of the respective positions).

The maintenance control portion 110*d* controls the recording heads 17*a* to 17*c* to execute the above-described purging in which the ink is forcibly extruded through the ink ejection ports 18. While controlling the recording heads 17*a* to 17*c* to execute the purging, the maintenance control portion 110*d* also controls driving of the above-described maintenance unit 19 (for example, so that the maintenance unit 19 moves to below the recording portion 9 and retreats therefrom).

Furthermore, as shown in FIG. 3, the printer 100 includes ink receivers 31Y, 31M, 31C, and 31K provided on an inner circumferential surface side of the first conveyance belt 8. When flushing is executed by the recording heads 17*a* to 17*c*, the ink receivers 31Y to 31K receive and collect the ink that has been ejected from the recording heads 17*a* to 17*c* and then passed through the openings 80 of the first conveyance belt 8. Accordingly, the ink receivers 31Y to 31K are each provided at a position opposed, via the first conveyance belt 8, to the recording heads 17*a* to 17*c* of a corresponding one of the line heads 11Y to 11K. The ink collected by the ink receivers 31Y to 31K is sent, via an ink discharge flow path (not shown), to, for example, a waste ink tank (not shown) so as to be discarded.

The second conveyance unit 12 includes a second conveyance belt 12*a* and a dryer 12*b*. The second conveyance belt 12*a* is stretched over two rollers that are a driving roller 12*c* and a driven roller 12*d*. The sheet P that has been conveyed by the first conveyance unit 5 and to which the ink has been ejected by the recording portion 9 so that an image is recorded thereon is conveyed by the second conveyance belt 12*a*, while being dried by the dryer 12*b* during the conveyance, to the above-described decurler portion 14.

[2. Details of First Conveyance Belt]

Figure 5:
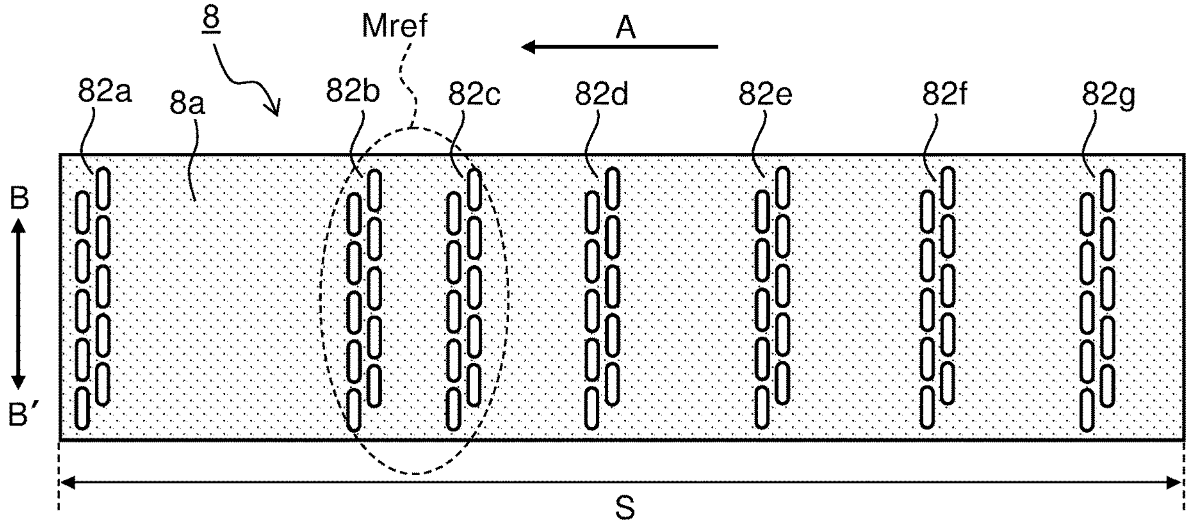
FIG. 5 is a plan view showing a configuration example of a first conveyance belt used in a printer according to a first embodiment of the present invention.
Figure 6:
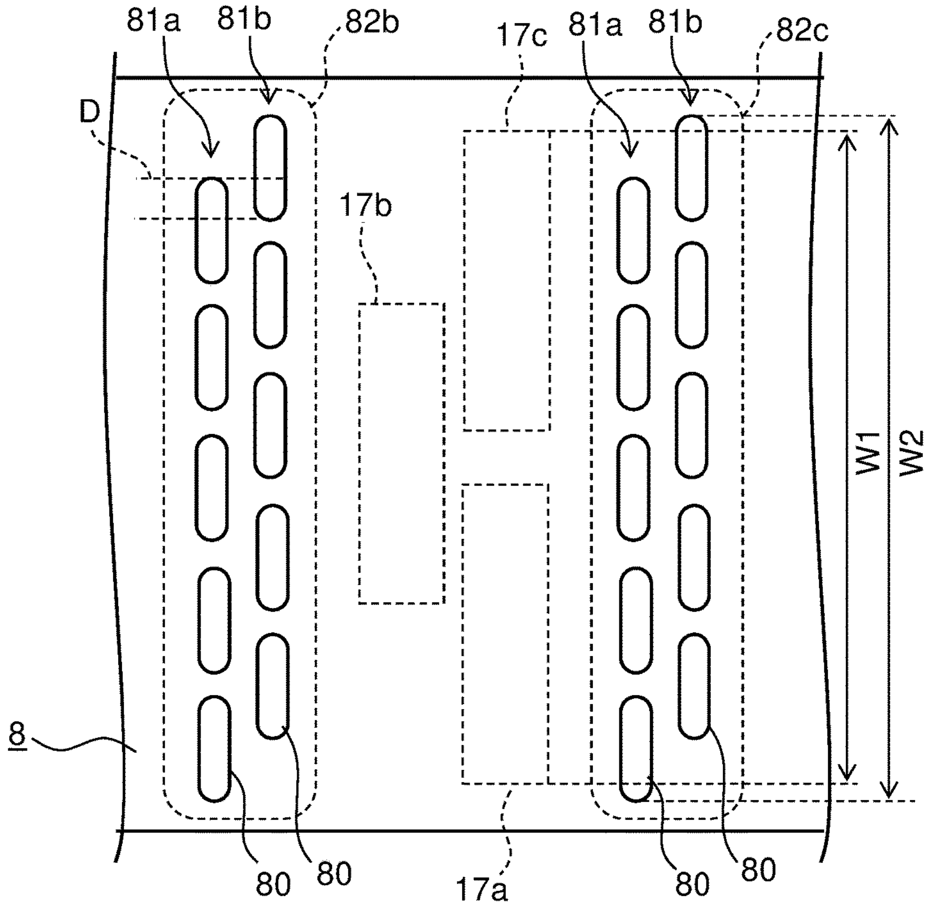
FIG. 6 is a partially enlarged view of a vicinity of openings of the first conveyance belt in FIG. 5.

Next, a description is given of details of the first conveyance belt 8 of the first conveyance unit 5. FIG. 5 is a plan view showing a configuration example of a first conveyance belt 8 used in a printer 100 according to a first embodiment of the present invention. FIG. 6 is a partially enlarged view of a vicinity of a second opening group 82*b* and a third opening group 82*c* of the first conveyance belt 8 in FIG. 5.

This embodiment employs a negative pressure suction method in which the sheet P is conveyed while being absorbed to the first conveyance belt 8 by negative pressure suction. To this end, over an entire region of the first conveyance belt 8, numerous suction holes 8*a* are formed for passing therethrough suction air for causing the sheet P to be absorbed to the first conveyance belt 8 by the negative pressure suction.

The first conveyance belt 8 has a plurality of openings 80 for passing therethrough ink ejected through nozzles (ink ejection ports 18) of recording heads 17*a* to 17*c* during flushing. The openings 80 are holes formed to be elongated in a width direction of the first conveyance belt 8 (an arrow B-B' direction, hereinafter, simply referred to also as a width direction). While in this embodiment, when viewed in plan, the openings 80 have a rectangular shape with rounded corner regions as shown in FIG. 5, they may have a rectangular shape or any other shape (for example, an oval shape).

In this embodiment, a first opening group 82*a* to a seventh opening group 82*g* each composed of a plurality of openings 80 arranged in the width direction and in a conveyance direction of the first conveyance belt 8 (an arrow A direction, hereinafter, simply referred to also as a conveyance direction) are disposed at prescribed spacings in seven locations within one cycle S of the first conveyance belt 8 along the conveyance direction. The opening groups 82*a* to 82*g* are each composed of two opening rows 81*a* and 81*b*. In the conveyance direction, the opening groups 82*a* to 82*g* are formed not at equal spacings but irregularly at respective positions corresponding to a size of the sheet P to be conveyed. That is, in a sheet conveyance direction, spacings between adjacent ones of opening groups 82 are not constant but vary. At this time, a maximum spacing between each pair of adjacent two of the opening groups 82 in the conveyance direction is longer than a length, in the conveyance direction, of the sheet P of a printable minimum size (for example, an A4 size in landscape orientation) placed on the first conveyance belt 8.

At least one of the spacings between adjacent ones of the first opening group 82*a* to the seventh opening group 82*g* in the conveyance direction is larger than a spacing between the opening row 81*a* and the opening row 81*b*. That is, at least one of the prescribed spacings at which the first opening group 82*a* to the seventh opening group 82*g* are disposed in the conveyance direction is larger than the spacing between the opening row 81*a* and the opening row 81*b*.

In each of the opening rows 81*a* and 81*b*, a plurality of (herein, five) openings 80 are disposed at equal spacings in the width direction. When viewed from the conveyance direction, each of the openings 80 of the opening row 81*a* as one of the opening rows 81*a* and 81*b* is disposed so as to overlap a part (a longitudinal end), in the belt width direction, of a corresponding one of the openings 80 of the opening row 81*b* as the other of the opening rows 81*a* and 81*b* (so as to have an overlapping part D). That is, on the first conveyance belt 8, the plurality of openings 80 constituting each of the opening groups 82 are disposed in a staggered manner. The number of the openings 80 of the opening row 81*a* as one of the opening rows 81*a* and 81*b* may be different from the number of the openings 80 of the opening row 81*b* as the other of the opening rows 81*a* and 81*b*.

Here, when a head width of line heads 11Y to 11K (the recording heads 17*a* to 17*c*) is indicated as W1 (mm), a width W2 (mm) of the opening groups 82 in the belt width direction is larger than W1. As a result, when the recording heads 17*a* to 17*c* execute flushing, the ink ejected through the ink ejection ports 18 of the recording heads 17*a* to 17*c* passes through either the openings 80 of the opening row 81*a* or the openings 80 of the opening row 81*b*. Accordingly, the flushing is executed over the entire head width by the recording heads 17*a* to 17*c*, and thus it becomes possible to reduce clogging due to drying of the ink in all the ink ejection ports 18.

In this embodiment, in accordance with a size of the sheet P used, a control device 110 (for example, a flushing control portion 110*b*) determines a pattern (a combination) of a plurality of opening groups 82 in the sheet conveyance direction, which is used for flushing in the one cycle S of the first conveyance belt 8. To be more specific, a reference specifying area Mref on the first conveyance belt 8 is read by a belt sensor 24 or 25, and based on positional information on the reference specifying area Mref and size information on the sheet P, a timing for conveying the sheet P from a registration roller pair 13 to the first conveyance belt 8 is caused to vary. Thus, control is performed so that, at a constant cycle, the first opening group 82*a* to the seventh opening group 82*g* are positioned in inter-sheet spaces between the sheets P being continuously conveyed.

Based on information stored in a storage portion 28 (for example, the size information on the sheet P inputted via an operation panel 27), the control device 110 can recognize the size of the sheet P used. A timing for performing the flushing is based on the "inter-sheet spaces" without being limited thereto. For example, the flushing can also be performed before an image is formed on a foremost one of the sheets P or after an image has been formed on a rearmost one of the sheets P.

[3. Configuration of First Belt Conveyance Portion in Printer of First Embodiment]

Next, a description is given of a configuration of a first belt conveyance portion 5 in the printer 100 of the first embodiment. FIG. 7 to FIG. 10 are each a plan view schematically showing a positional relationship between the opening groups 82*a* to 82*g* of the first conveyance belt 8 and a driving roller 6*a* in the printer 100 of the first embodiment.

Figure 7:
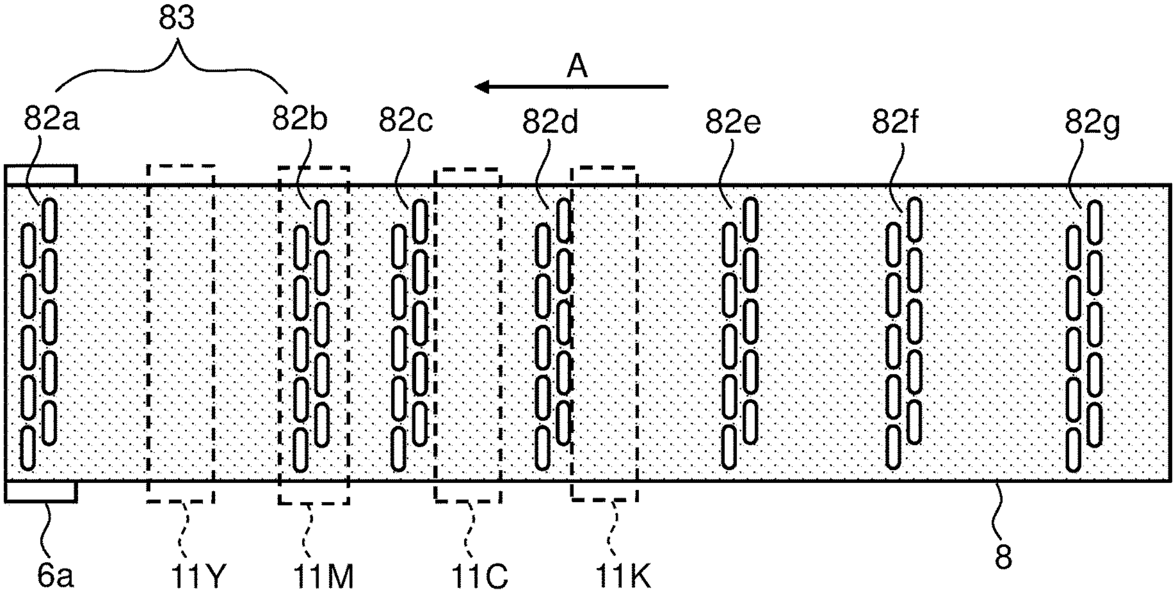
FIG. 7 is a plan view schematically showing a positional relationship of opening groups of the first conveyance belt with a driving roller and line heads in the printer of the first embodiment, which illustrates a state where a first opening group positionally coincides with the driving roller.

FIG. 7 shows a state where the first opening group 82*a* positionally coincides with the driving roller 6*a*. The first conveyance belt 8 has a lower strength in a region thereof in which each of the opening groups 82*a* to 82*g* is formed. Because of this, in the state shown in FIG. 7 in which the first opening group 82*a* positionally coincides with the driving roller 6*a*, compared with a state where a region of the first conveyance belt 8 in which none of the opening groups 82*a* to 82*g* is formed positionally coincides with the driving roller 6*a*, an amount of elongation of the first conveyance belt 8 is increased. As a result, a rotation speed of the first conveyance belt 8 is slightly decreased.

At this time, the second opening group 82*b* is positioned immediately below the line head 11M. That is, when the sheet P does not overlap the second opening group 82*b*, in the line head 11M, flushing is executed instead of printing. Further, when the first opening group 82*a* passes by the driving roller 6*a* as the first conveyance belt 8 rotates, the second opening group 82*b* also moves from immediately below the line head 11M, and thus printing is executed on the sheet P. Accordingly, in the line head 11M, the printing can be performed without having an influence of a variation in amount of elongation of the first conveyance belt 8 caused when the first opening group 82*a* positionally coincides with the driving roller 6*a*.

Figure 8:
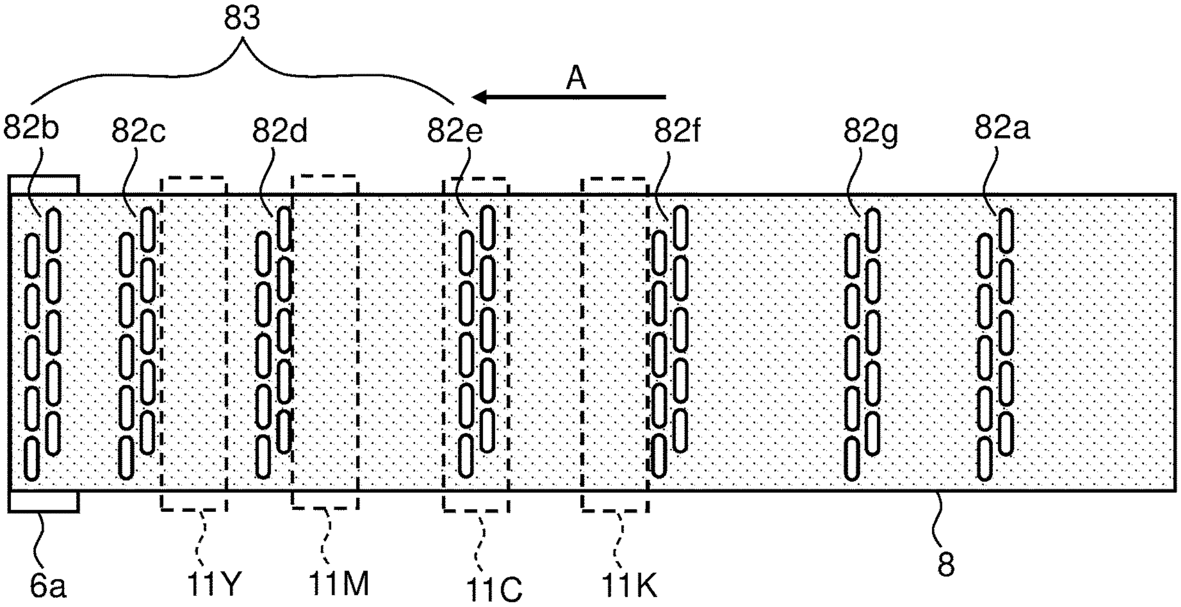
FIG. 8 is a view showing a state where the first conveyance belt has rotated for a prescribed amount from the state shown in FIG. 7, so that a second opening group positionally coincides with the driving roller.

FIG. 8 is a view showing a state where the first conveyance belt 8 has rotated for a prescribed amount from the state shown in FIG. 7, so that the second opening group 82*b* positionally coincides with the driving roller 6*a*. At this time, the fifth opening group 82*e* is positioned immediately below the line head 11C. That is, when the sheet P does not overlap the fifth opening group 82*e*, in the line head 11C, flushing is executed instead of printing. Further, when the second opening group 82*b* passes by the driving roller 6*a* as the first conveyance belt 8 rotates, the fifth opening group 82*e* also moves from immediately below the line head 11C, and thus printing is executed on the sheet P. Accordingly, in the line head 11C, the printing can be performed without having an influence of a variation in amount of elongation of the first conveyance belt 8 caused when the second opening group 82*b* positionally coincides with the driving roller 6*a*.

Figure 9:
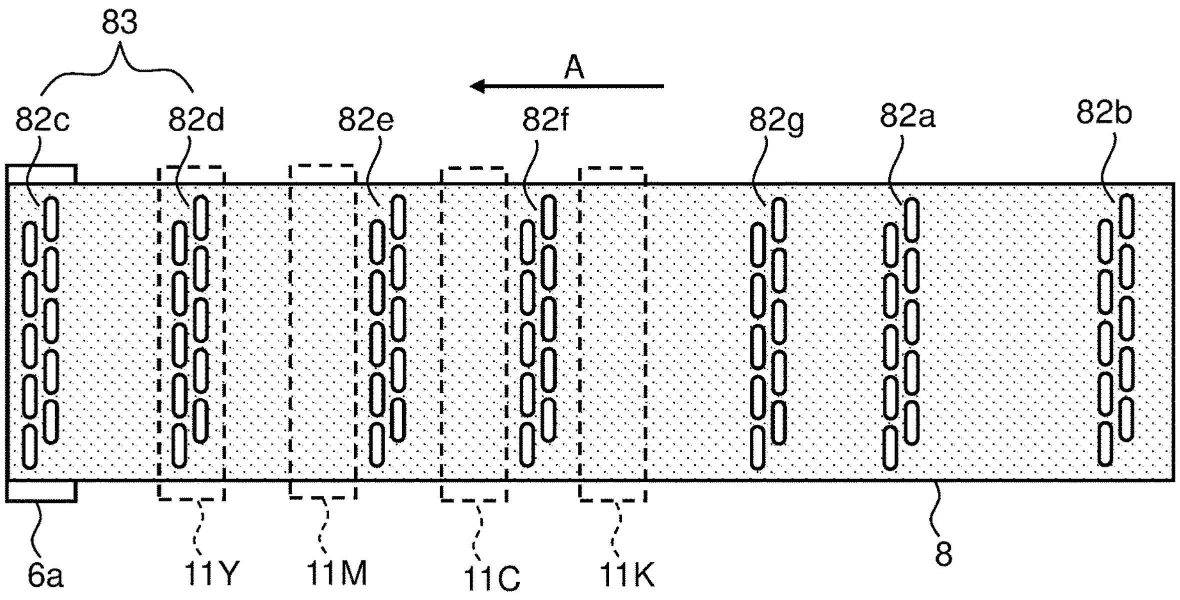
FIG. 9 is a view showing a state where the first conveyance belt has rotated for a prescribed amount from the state shown in FIG. 8, so that a third opening group positionally coincides with the driving roller.
Figure 10:
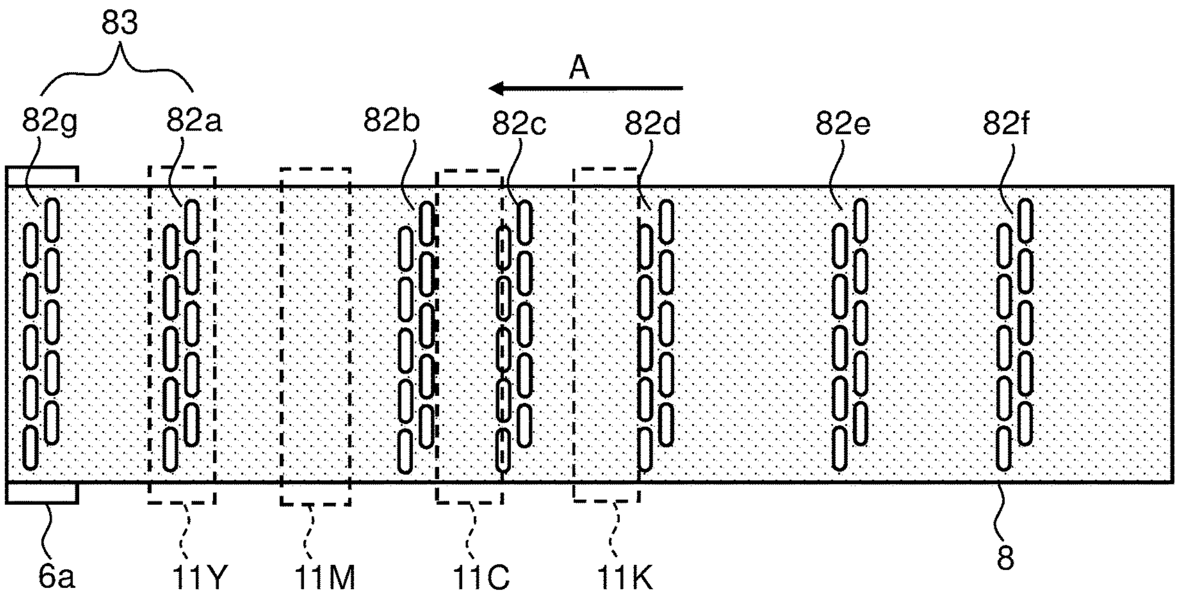
FIG. 10 is a view showing a state where the first conveyance belt has rotated for a prescribed amount from the state shown in FIG. 9, so that a seventh opening group positionally coincides with the driving roller.

FIG. 9 is a view showing a state where the first conveyance belt 8 has rotated for a prescribed amount from the state shown in FIG. 8, so that the third opening group 82*c* positionally coincides with the driving roller 6*a*. FIG. 10 is a view showing a state where the first conveyance belt 8 has rotated for a prescribed amount from the state shown in FIG. 9, so that the seventh opening group 82*g* positionally coincides with the driving roller 6*a*. In FIG. 9, the fourth opening group 82*d* is positioned immediately below the line head 11Y. In FIG. 10, the first opening group 82*a* is positioned immediately below the line head 11Y. Further, when the third opening group 82*c* and the seventh opening group 82*g* pass by the driving roller 6*a* as the first conveyance belt 8 rotates, the fourth opening group 82*d* and the first opening group 82*a* also move from immediately below the line head 11Y, respectively, and thus printing is executed on the sheet P. Accordingly, in the line head 11Y, the printing can be executed without having an influence of a variation in amount of elongation of the first conveyance belt 8 caused when the third opening group 82*c* and the seventh opening group 82*g* positionally coincide with the driving roller 6*a*.

In this embodiment, among the plurality of (herein, seven) opening groups 82*a* to 82*g* formed in the first conveyance belt 8, there is a pair of opening groups (hereinafter, referred to as an opening pair 83) that is in such a positional relationship that, when any one of the opening groups 82*a* to 82*g* as one of the pair of opening groups positionally coincides with (is in contact with) the driving roller 6*a*, the other of the pair of opening groups is positioned immediately below any one of the line heads 11Y to 11K. Specifically, there are four opening pairs 83 in total, which are a pair of the first opening group 82*a* and the second opening group 82*b*, a pair of the second opening group 82*b* and the fifth opening group 82*e*, a pair of the third opening group 82*c* and the fourth opening group 82*d*, and a pair of the seventh opening group 82*g* and the first opening group 82*a*.

When a leading one of the opening groups constituting each of the opening pairs 83 (a downstream one of the opening groups in the conveyance direction) positionally coincides with the driving roller 6*a*, a trailing one of the opening groups (an upstream one of the opening groups in the conveyance direction) is positioned immediately below any one of the line heads 11Y to 11K. With this configuration, in the any one of the line heads 11Y to 11K below which the trailing one of the opening groups is positioned, flushing is executed to prevent printing from being executed.

In FIG. 7, none of the opening groups 82*c* to 82*g* are positioned immediately below the line heads 11Y, 11C, and 11K. That is, in the line heads 11Y, 11C, and 11K, there is exerted an influence of a variation in amount of elongation of the first conveyance belt 8 caused when the first opening group 82*a* positionally coincides with the driving roller 6*a*. Similarly, also in FIG. 8 to FIG. 10, in any of the line heads 11Y to 11K below which none of the opening groups 82*c* to 82*g* are positioned, there is exerted an influence of a variation in amount of elongation of the first conveyance belt 8.

However, since there is a line head, among the line heads 11Y to 11K, in which printing is not executed at a timing when a variation in amount of elongation of the first conveyance belt 8 is large, it is possible to reduce an influence, on printing, of the variation in amount of elongation of the first conveyance belt 8 due to any one of the opening groups 82*a* to 82*g* positionally coinciding with the driving roller 6*a*, thus suppressing a decrease in image quality.

Here, when any one of the opening groups 82*a* to 82*g* positionally coincides with the driving roller 6*a*, the higher a frequency at which any one of the opening groups 82*a* to 82*g* is positioned immediately below any one of the line heads 11Y to 11K, the more an influence of a variation in amount of elongation of the first conveyance belt 8 can be reduced. That is, it is preferable that a highest possible number (ratio) of opening groups among all the opening groups 82*a* to 82*g* constitute the above-described opening pair 83. Specifically, a ratio of the number of opening groups among the opening groups 82*a* to 82*g* constituting the opening pair 83 to the number of all the opening groups 82*a* to 82*g* is preferably not less than ¼ and more preferably not less than ½. Moreover, it is even more preferable that all the opening groups 82*a* to 82*g* constitute the opening pair 83.

In this embodiment, among the opening groups 82*a* to 82*g*, six opening groups other than the sixth opening group 82*f* constitute the opening pair 83, and thus the ratio of the number (six) of opening groups among the opening groups 82*a* to 82*g* constituting the opening pair 83 to the number (seven) of all the opening groups 82*a* to 82*g* is 6/7.

Furthermore, preferably, when any one of the opening groups 82*a* to 82*g* positionally coincides with the driving roller 6*a*, any of the opening groups 82*a* to 82*g* is/are always positioned immediately below at least one of the line heads 11Y to 11K.

Figure 11:
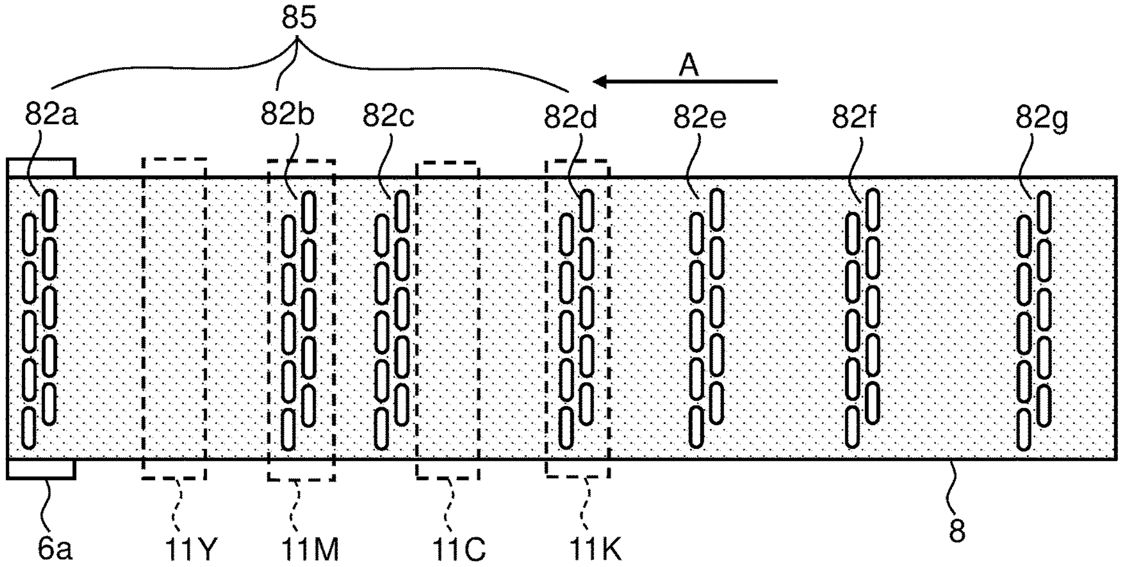
FIG. 11 is a plan view schematically showing a positional relationship of opening groups of a first conveyance belt with a driving roller and line heads in a printer as a modification example of the first embodiment, which illustrates a state where a first opening group positionally coincides with the driving roller.

FIG. 11 is a plan view schematically showing a positional relationship between the opening groups 82*a* to 82*g* of the first conveyance belt 8 and the driving roller 6*a* in the printer 100 as a modification example of the first embodiment. In the modification example shown in FIG. 11, on the first conveyance belt 8, the opening groups 82*a* to 82*g* formed therein have a different disposition pattern, and in a state where the first opening group 82*a* positionally coincides with the driving roller 6*a*, the second opening group 82*b* is positioned immediately below the line head 11M. Furthermore, the fourth opening group 82*d* is positioned immediately below the line head 11K.

As described above, when any one of the opening groups 82*a* to 82*g* positionally coincides with the driving roller 6*a*, a combination of opening groups (hereinafter, referred to as an opening set 85) among the opening groups 82*a* to 82*g* is simultaneously positioned immediately below any of the line heads 11Y to 11K, and thus it is possible to increase the number of line heads, among the line heads 11Y to 11K, which execute flushing instead of printing when any one of the opening groups 82*a* to 82*g* positionally coincides with the driving roller 6*a*, thus effectively suppressing a decrease in image quality. Also for the opening set 85, it is preferable that a highest possible number (ratio) of opening groups among all the opening groups 82*a* to 82*g* constitute the opening set 85.

[4. Configuration of First Belt Conveyance Portion in Printer of Second Embodiment]

Figure 12:
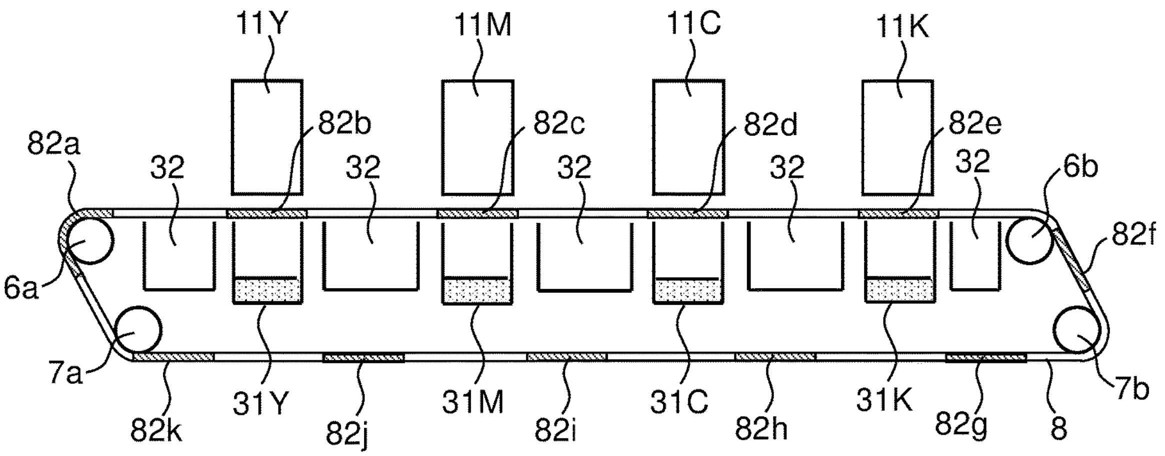
FIG. 12 is a side view schematically showing a positional relationship of opening groups of a first conveyance belt with a driving roller and line heads in a printer according to a second embodiment of the present invention, which illustrates a state where a first opening group positionally coincides with the driving roller.

Next, a description is given of a configuration of a first belt conveyance portion 5 in a printer 100 of a second embodiment of the present invention. FIG. 12 is a side view schematically showing a positional relationship between opening groups 82*a* to 82*k* of a first conveyance belt 8 and a driving roller 6*a* in the printer 100 according to the second embodiment of the present invention.

In this embodiment, the first conveyance belt 8 has a first opening group 82*a* to an eleventh opening group 82*k* (hatched regions in the figure) formed at equal spacings in 11 locations thereon along a conveyance direction. Furthermore, the spacings between the opening groups 82*a* to 82*k* are each equal to a disposition spacing between each pair of adjacent ones of line heads 11Y to 11K. Moreover, the spacings between the opening groups 82*a* to 82*k* are each equal to a distance from the line head 11Y on a most downstream side in the conveyance direction to the driving roller 6*a*.

Thus, as shown in FIG. 12, in a state where the first opening group 82*a* positionally coincides with the driving roller 6*a*, four opening groups subsequent thereto, namely, the second opening group 82*b* to the fifth opening group 82*e* are positioned immediately below the line heads 11Y to 11K, respectively.

Figure 13:
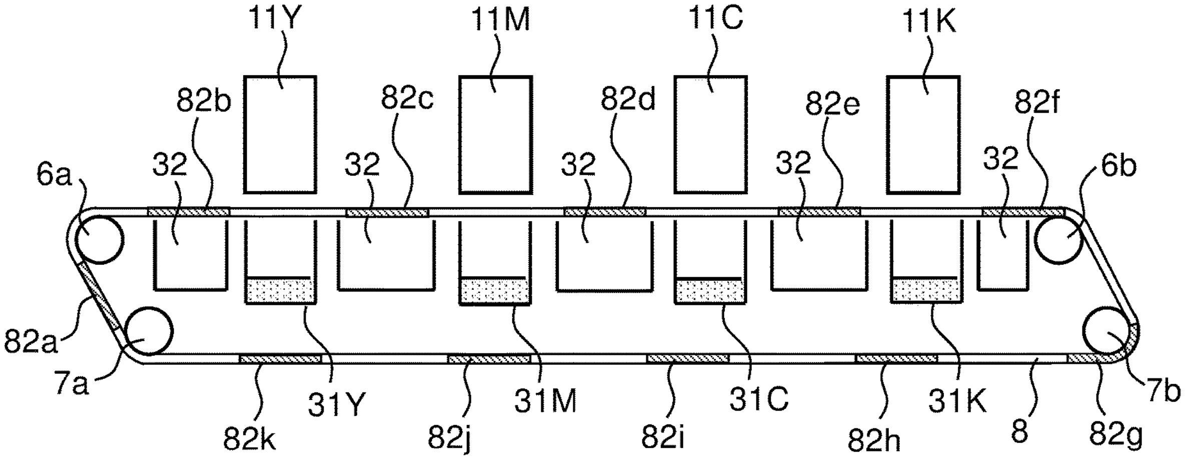
FIG. 13 is a view showing a state where the first conveyance belt has rotated for a prescribed amount from the state shown in FIG. 12, so that the first opening group no longer positionally coincides with the driving roller.

FIG. 13 is a view showing a state where the first conveyance belt 8 has rotated for a prescribed amount from the state shown in FIG. 12, so that the first opening group 82*a* no longer positionally coincides with the driving roller 6*a*. When the first opening group 82*a* passes by the driving roller 6*a*, the second opening group 82*b* to the fifth opening group 82*e* also move from immediately below the line heads 11Y to 11K, respectively. When the first conveyance belt 8 rotates further so that the second opening group 82*b* positionally coincides with the driving roller 6*a*, four opening groups subsequent thereto, namely, the third opening group 82*c* to the sixth opening group 82*f* are disposed immediately below the line heads 11Y to 11K, respectively. Thereafter, similarly, when any one of the third opening group 82*c* to the eleventh opening group 82*k* positionally coincides with the driving roller 6*a*, among the first opening group 82*a* to the eleventh opening group 82*k*, four opening groups subsequent to the any one of the opening groups 82*c* to 82*k* positionally coinciding with the driving roller 6*a* are sequentially disposed immediately below the line heads 11Y to 11K, respectively.

Figure 14:
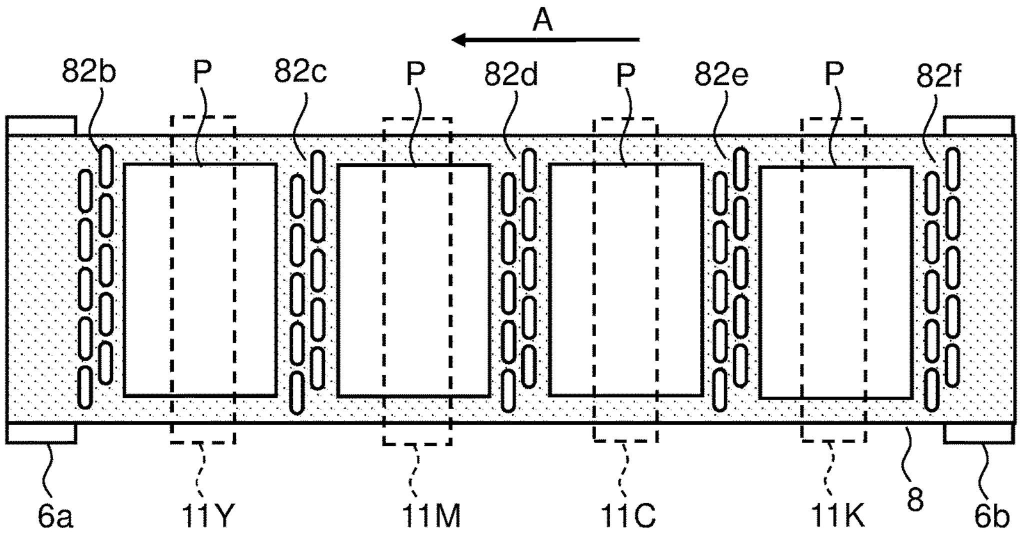
FIG. 14 is a plan view schematically showing a positional relationship of the opening groups of the first conveyance belt with the driving roller and the line heads in the printer of the second embodiment, which illustrates how sheets of a small size are conveyed while being absorbed to the first conveyance belt.

FIG. 14 is a plan view schematically showing a positional relationship of the opening groups 82*a* to 82*k* of the first conveyance belt 8 with the driving roller 6*a* and the line heads 11Y to 11K in the printer 100 of the second embodiment, which illustrates how the sheets P of a small size are conveyed while being absorbed to the first conveyance belt 8.

As shown in FIG. 14, the sheets P of the small size (for example, an A4 landscape size) are disposed between adjacent ones of the opening groups 82*a* to 82*k*. As shown in FIG. 12, in a state where any one of the opening groups 82*a* to 82*k* positionally coincides with the driving roller 6*a*, among the opening groups 82*a* to 82*k*, four opening groups subsequent thereto are always positioned immediately below the line heads 11Y to 11K, respectively, and thus flushing is executed instead of printing on the sheets P.

On the other hand, as shown in FIG. 13, in a state where none of the opening groups 82*a* to 82*k* positionally coincides with the driving roller 6*a*, the sheets P disposed between adjacent ones of the opening groups 82*a* to 82*k* are always positioned immediately below the line heads 11Y to 11K, and thus there is executed printing on the sheets P. Accordingly, in all the line heads 11Y to 11K, printing on the sheets P can be always performed without having an influence of a variation in amount of elongation of the first conveyance belt 8.

Figure 15:
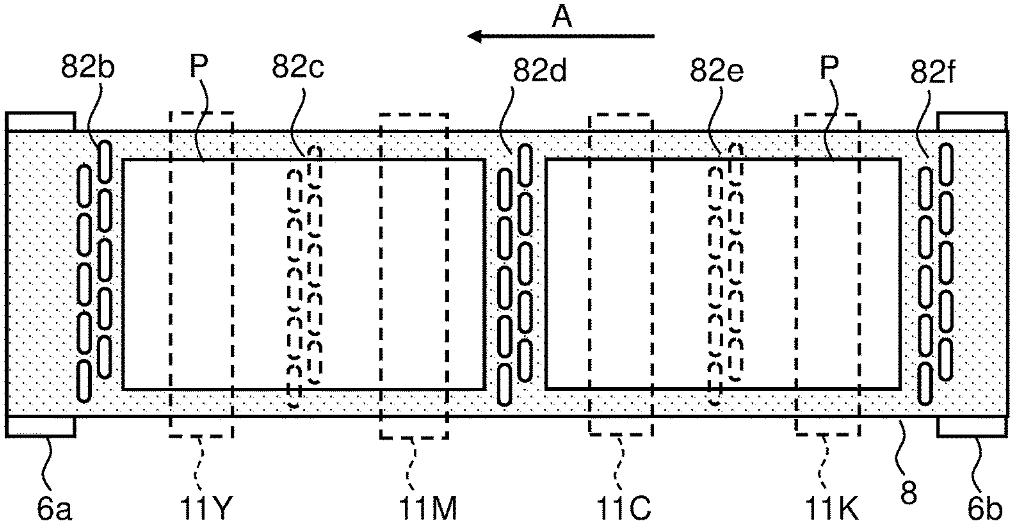
FIG. 15 is a plan view schematically showing a positional relationship of the opening groups of the first conveyance belt with the driving roller and the line heads in the printer of the second embodiment, which illustrates how sheets of a large size are conveyed while being absorbed to the first conveyance belt.

FIG. 15 is a plan view illustrating how the sheets P of a large size are conveyed while being absorbed to the first conveyance belt 8. As shown in FIG. 15, the sheets P of the large size (for example, an A3 size) are each disposed across any one of the opening groups 82*a* to 82*k* (herein, the third opening group 82*c* and the fifth opening group 82*e*). Thus, even in a case where any one of the opening groups 82*a* to 82*k* positionally coincides with the driving roller 6*a* and the third opening group 82*c* and the fifth opening group 82*e* each lie immediately below any one of the line heads 11Y to 11K, printing needs to be executed.

During printing on the sheets P, however, an influence of a variation in amount of elongation of the first conveyance belt 8 is exerted only on respective center areas of the sheets P overlapping the third opening group 82*c* and the fifth opening group 82*e*. Accordingly, even in the printing on the sheets P of the large size each disposed across any one of the opening groups 82*a* to 82*k*, it is possible to reduce the influence of a variation in amount of elongation of the first conveyance belt 8.

In order to maximally reduce an influence, on printing, of a variation in amount of elongation of the first conveyance belt 8, preferably, the spacings between the opening groups 82*a* to 82*k* are each set to be larger than a most frequently used size of the sheet P.

Furthermore, while in the configuration used herein, the spacings between the opening groups 82*a* to 82*k* are each equal to the distance from the line head 11Y on the most downstream side in the conveyance direction to the driving roller 6*a*, the distance from the line head 11Y to the driving roller 6*a* may be an integral multiple of each of the spacings between the opening groups 82*a* to 82*k*.

[5. Configuration of First Belt Conveyance Portion in Printer of Third Embodiment]

Figure 16:
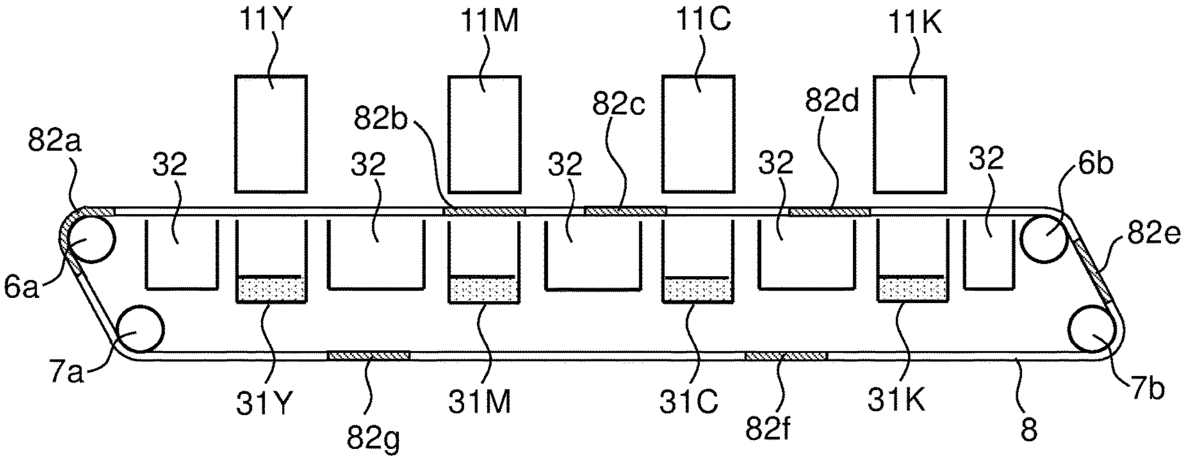
FIG. 16 is a side view schematically showing a positional relationship of opening groups of a first conveyance belt with a driving roller and line heads in a printer according to a third embodiment of the present invention, which illustrates a state where a first opening group positionally coincides with the driving roller.

Next, a description is given of a configuration of a first belt conveyance portion 5 in a printer 100 of a third embodiment of the present invention. FIG. 16 is a side view schematically showing a positional relationship between opening groups 82*a* to 82*g* of a first conveyance belt 8 and a driving roller 6*a* in the printer 100 according to the third embodiment of the present invention. On the first conveyance belt 8, the opening groups 82*a* to 82*g* formed therein have a similar disposition pattern to that in the first embodiment.

Here, a summarized description is given of rollers being in contact with the first conveyance belt 8. Among the rollers being in contact with the first conveyance belt 8, aside from the driving roller 6*a*, rollers that cause a moving direction of the first conveyance belt 8 to vary by not less than 30 degrees are each referred to as a stretching roller. In this embodiment, a tension roller 7*a*, a tension roller 7*b*, and a driven roller 6*b* are regarded as the stretching rollers.

Furthermore, a plane of the first conveyance belt 8 at a position opposed to recording heads 17*a* to 17*c* is referred to as a placement plane. Among the stretching rollers, rollers disposed at an upstream end and a downstream end of the placement plane in a conveyance direction are each referred to as a conveyance end roller. In this embodiment, the driven roller 6*b* is the stretching roller disposed at the upstream end of the placement plane in the conveyance direction and thus is regarded as the conveyance end roller. While being disposed at the downstream end of the placement plane in the conveyance direction, the driving roller 6*a* is not the stretching roller and thus is not regarded as the conveyance end roller. In a case where a roller that is not externally driven is disposed at a position of the driving roller 6*a*, such a roller is regarded as the conveyance end roller.

In this embodiment, as shown in FIG. 16, when the first opening group 82*a* positionally coincides with the driving roller 6*a*, the other opening groups 82*b* to 82*g* positionally coincide with none of the driven roller 6*b* and the tension rollers 7*a* and 7*b*. That is, there is such an opening group (hereinafter, referred to as a particular opening group) that, when the opening group as a certain one (herein, the first opening group 82*a*) of the opening groups 82*a* to 82*g* positionally coincides with (is in contact with) the driving roller 6*a*, the other opening groups (herein, the opening groups 82*b* to 82*g*) do not positionally coincide with the conveyance end roller (the driven roller 6*b*).

Moreover, among the opening groups 82*a* to 82*g*, the particular opening group is in such a positional relationship that, in a state where the particular opening group is in contact with the driving roller 6*a*, all the others of the opening groups 82*a* to 82*g* are not in contact with the stretching rollers (the driven roller 6*b* and the tension rollers 7*a* and 7*b*).

In other words, this means that there is such an opening group that, when the opening group as a certain one (herein, the first opening group 82*a*) of the opening groups 82*a* to 82*g* positionally coincides with (is in contact with) the driving roller 6*a*, the other opening groups (herein, the opening groups 82*b* to 82*g*) do not positionally coincide with the stretching rollers (the driven roller 6*b* and the tension rollers 7*a* and 7*b*).

When any one of the opening groups 82*a* to 82*g* positionally coincides with the driving roller 6*a*, if any of the others of the opening groups 82*a* to 82*g* positionally coincide(s) with any of the driven roller 6*b* and the tension rollers 7*a* and 7*b*, an amount of elongation of the first conveyance belt 8 will be increased. Because of this, if printing is executed in that state, there will be exerted a considerable influence of a variation in the amount of elongation.

As a solution thereto, the particular opening group (the first opening group 82*a*) is provided as in this embodiment, and thus it is possible to suppress to a minimum an influence of an amount of elongation of the first conveyance belt 8 when printing is executed in a state where the particular opening group positionally coincides with the driving roller 6*a*. Furthermore, the higher the number (ratio) of the particular opening groups among all the opening groups 82*a* to 82*g*, the more the influence of a variation in the amount of elongation of the first conveyance belt 8 can be reduced. Moreover, it is even more preferable that all the opening groups 82*a* to 82*g* be the particular opening groups.

Particularly, when this embodiment is combined with the first embodiment in which there is a possibility that printing is executed when any one of the opening groups 82*a* to 82*g* positionally coincides with the driving roller 6*a*, it becomes possible to even further reduce an influence of an amount of belt elongation. Furthermore, even in the second embodiment in which, when any one of the opening groups 82*a* to 82*k* positionally coincides with the driving roller 6*a*, any of the opening groups 82*a* to 82*k* are positioned immediately below all the line heads 11Y to 11K, in a case where the sheet P of a large size is disposed across any one of the opening groups 82*a* to 82*k* as shown in FIG. 15, it is effective that the second embodiment is combined with this embodiment.

[6. Others]

The present invention is not limited to the foregoing embodiments and can be variously modified without departing from the spirit of the present invention. For example, while the foregoing embodiments describe the case where the sheet P is conveyed while being absorbed to the first conveyance belt 8 by negative pressure suction using a suction portion 32, a configuration may also be adopted in which the first conveyance belt 8 is charged so that the sheet P is conveyed while being absorbed to the first conveyance belt 8 by electrostatic absorption (an electrostatic absorption method).

Furthermore, while the foregoing embodiments describe the example using, as an inkjet recording apparatus, the printer 100 that uses ink of four different colors to record a color image, the configuration of the first belt conveyance portion 5 of the embodiments of the present invention can be used also in a case of using a monochrome printer that uses black ink to record a monochrome image.

INDUSTRIAL APPLICABILITY

The present invention is usable in an inkjet recording apparatus such as an inkjet printer.

The invention claimed is:

1. An inkjet recording apparatus, comprising:

a line head including at least one recording head having a plurality of nozzles for ejecting ink;

an endless conveyance belt that has a plurality of openings and carries thereon and conveys a recording medium;

a driving roller that contacts an inner circumferential surface of the conveyance belt at a downstream side of the conveyance belt in a conveyance direction for conveying the recording medium and drives to rotate the conveyance belt;

one or more stretching rollers that, together with the driving roller, stretch the conveyance belt over themselves; and a control portion that controls driving of the at least one recording head and the conveyance belt so as to execute flushing in which, at a timing different from a timing contributing to image recording, the ink is ejected through the plurality of nozzles of the at least one recording head to pass through any of the plurality of openings, wherein the conveyance belt has a plurality of opening groups each composed of a plurality of openings arranged in a width direction of the conveyance belt and in the conveyance direction, each being identical to each of the plurality of openings, and the opening groups are formed in plural locations on the conveyance belt at prescribed spacings in the conveyance direction, in a state where any one of the opening groups is in contact with the driving roller, at least one of others of the opening groups is positioned immediately below the line head, and the plurality of opening groups are formed not at equal spacings but at irregular spacings in the conveyance direction.

2. The inkjet recording apparatus according to claim 1, wherein the control portion performs control in which an image recording operation is executed when the driving roller is in contact with none of the plurality of opening groups, and the flushing is executed instead of the image recording operation when the driving roller is in contact with at least one of the plurality of opening groups.

3. The inkjet recording apparatus according to claim 1, wherein when the any one of the opening groups being in contact with the driving roller and the at least one of others of the opening groups positioned immediately below the line head constitute an opening pair, a ratio of a number of opening groups constituting the opening pair to a number of all the opening groups is not less than 1/4.

4. The inkjet recording apparatus according to claim 3, wherein all the opening groups each constitute the opening pair.

5. The inkjet recording apparatus according to claim 4, wherein in a state where any one of the opening groups is in contact with the driving roller, at least one of others of the opening groups is always positioned immediately below the line head.

6. The inkjet recording apparatus according to claim 1, wherein a plurality of line heads, each being identical to the line head, are disposed in the conveyance direction, and there is at least one opening set that is a combination of the any one of the opening groups being in contact with the driving roller and a plurality of opening groups among the opening groups simultaneously positioned immediately below the plurality of line heads.

7. The inkjet recording apparatus according to claim 6, wherein in a state where any one of the opening groups is in contact with the driving roller, any of the opening groups are always positioned immediately below all the plurality of line heads.

8. The inkjet recording apparatus according to claim 7, wherein the conveyance belt has the plurality of opening groups formed therein at equal spacings, the spacings between the opening groups are each equal to a disposition spacing between each pair of adjacent ones of the plurality of line heads, and a distance between one of the plurality of line heads positioned on a most downstream side in the conveyance direction and the driving roller is an integral multiple of each of the spacings between the opening groups.

9. The inkjet recording apparatus according to claim 1, wherein when, among the one or more stretching rollers, rollers disposed at an upstream end and a downstream end, in the conveyance direction, of a placement plane of the conveyance belt opposed to the at least one recording head are each referred to as a conveyance end roller, at least one of the opening groups is a particular opening group that is in such a positional relationship that, in a state where the particular opening group is in contact with the driving roller, all others of the opening groups are not in contact with the conveyance end roller.

10. An inkjet recording apparatus, comprising:

a line head including at least one recording head having a plurality of nozzles for ejecting ink;

an endless conveyance belt that has a plurality of openings and carries thereon and conveys a recording medium;

a driving roller that contacts an inner circumferential surface of the conveyance belt at a downstream side of the conveyance belt in a conveyance direction for conveying the recording medium and drives to rotate the conveyance belt;

one or more stretching rollers that, together with the driving roller, stretch the conveyance belt over themselves; and a control portion that controls driving of the at least one recording head and the conveyance belt so as to execute flushing in which, at a timing different from a timing contributing to image recording, the ink is ejected through the plurality of nozzles of the at least one recording head to pass through any of the plurality of openings, wherein the conveyance belt has a plurality of opening groups each composed of a plurality of openings arranged in a width direction of the conveyance belt and in the conveyance direction, each being identical to each of the plurality of openings, and the opening groups are formed in plural locations on the conveyance belt at prescribed spacings in the conveyance direction, in a state where any one of the opening groups is in contact with the driving roller, at least one of others of the opening groups is positioned immediately below the line head, and the conveyance belt has a plurality of suction holes for sucking the recording medium from inside a loop of the conveyance belt so that the recording medium is held by absorption, and the suction holes are formed separately from the openings.

11. An inkjet recording apparatus, comprising:

a line head including at least one recording head having a plurality of nozzles for ejecting ink;

an endless conveyance belt that has a plurality of openings and carries thereon and conveys a recording medium;

a driving roller that contacts an inner circumferential surface of the conveyance belt at a downstream side of the conveyance belt in a conveyance direction for conveying the recording medium and drives to rotate the conveyance belt;

one or more stretching rollers that, together with the driving roller, stretch the conveyance belt over themselves; and a control portion that controls driving of the at least one recording head and the conveyance belt so as to execute flushing in which, at a timing different from a timing contributing to image recording, the ink is ejected through the plurality of nozzles of the at least one recording head to pass through any of the plurality of openings, wherein when, among the one or more stretching rollers, rollers disposed at an upstream end and a downstream end, in the conveyance direction, of a placement plane of the conveyance belt opposed to the at least one recording head are each referred to as a conveyance end roller, at least one of a plurality of opening groups is a particular opening group that is in such a positional relationship that, in a state where the particular opening group is in contact with the driving roller, all others of the opening groups are not in contact with the conveyance end roller, and the plurality of opening groups are formed not at equal spacings but at irregular spacings in the conveyance direction.

12. The inkjet recording apparatus according to claim 11, wherein among the opening groups, the particular opening group is in such a positional relationship that, in a state where the particular opening group is in contact with the driving roller, all the others of the opening groups are not in contact with the one or more stretching rollers.

13. The inkjet recording apparatus according to claim 11, wherein all the opening groups are each the particular opening group.

* * * * *